United States Patent
Koskela et al.

(10) Patent No.: US 11,388,655 B2
(45) Date of Patent: Jul. 12, 2022

(54) CELLULAR AND WLAN AGGREGATION

(71) Applicant: Nokia Technologies Oy, Espoo (FI)

(72) Inventors: Jarkko Tuomo Koskela, Oulu (FI); Jussi-Pekka Koskinen, Oulu (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 15/544,718

(22) PCT Filed: Feb. 12, 2015

(86) PCT No.: PCT/US2015/015654
§ 371 (c)(1),
(2) Date: Jul. 19, 2017

(87) PCT Pub. No.: WO2016/130130
PCT Pub. Date: Aug. 18, 2016

(65) Prior Publication Data
US 2017/0367035 A1      Dec. 21, 2017

(51) Int. Cl.
*H04W 48/16*      (2009.01)
*H04L 5/00*      (2006.01)
(Continued)

(52) U.S. Cl.
CPC ............. *H04W 48/16* (2013.01); *H04L 5/001* (2013.01); *H04L 5/0094* (2013.01); *H04W 28/08* (2013.01); *H04W 48/20* (2013.01); *H04L 5/0044* (2013.01); *H04W 84/12* (2013.01); *H04W 88/06* (2013.01)

(58) Field of Classification Search
CPC ..... H04L 5/001; H04L 5/0044; H04L 5/0094; H04W 28/08; H04W 48/16
See application file for complete search history.

(56) References Cited

U.S. PATENT DOCUMENTS 8,824,298 B2   9/2014  Gupta et al.
9,629,028 B2 *  4/2017  Meylan .................. H04L 43/16
(Continued)

FOREIGN PATENT DOCUMENTS

CN       101345999 A      1/2009
CN       102612104 A      7/2012
(Continued)

OTHER PUBLICATIONS

"New SI Proposal: LTE-WLAN Radio Level Integration", 3GPP TSG-RAN meeting #66, RP-142281, Agenda: 14.1.2, Intel Corporation, Dec. 8-11, 2014, 8 pages.
(Continued)

*Primary Examiner* — Khaled M Kassim
*Assistant Examiner* — Berhanu D Belete
(74) *Attorney, Agent, or Firm* — Mintz Levin Cohn Ferris Glovsky and Popeo, P.C.

(57) ABSTRACT

In some example embodiments there is provided a method. The method may include determining, by a user equipment, whether at least one wireless local area network access point allows aggregation with cellular; and selecting, by the user equipment based on the determination, to couple to the at least one wireless local area network access point to enable the aggregation with cellular. Related systems, methods, and articles of manufacture are also described.

18 Claims, 4 Drawing Sheets

200

RECEIVE AN INDICATION OF WHETHER THE WLAN AP SUPPORTS CELLULAR WLAN AGGREGATION 210

OPERATE IN A CELLULAR WLAN AGGREGATION MODE AND SELECT, BASED ON THE RECEIVED INDICATION, A WLAN AP FOR AGGREGATION 220

(51) Int. Cl.
*H04W 28/08* (2009.01)
*H04W 48/20* (2009.01)
*H04W 84/12* (2009.01)
*H04W 88/06* (2009.01)

(56) References Cited

U.S. PATENT DOCUMENTS

| | | | | |
|---|---|---|---|---|
| 2009/0279492 A1* | 11/2009 | Montemurro | | H04W 76/19 370/329 |
| 2010/0157991 A1* | 6/2010 | Kim | | H04M 3/42221 370/352 |
| 2012/0315905 A1* | 12/2012 | Zhu | | H04W 36/36 455/436 |
| 2013/0242897 A1* | 9/2013 | Meylan | | H04W 28/16 370/329 |
| 2013/0286826 A1* | 10/2013 | Park | | H04W 28/08 370/230 |
| 2014/0029527 A1 | 1/2014 | Okuda | | |
| 2014/0043979 A1 | 2/2014 | Etemad et al. | | |
| 2014/0092828 A1* | 4/2014 | Sirotkin | | H04L 65/608 370/329 |
| 2014/0204904 A1* | 7/2014 | Xiang | | H04W 36/0066 370/331 |
| 2014/0341038 A1* | 11/2014 | Lim | | H04W 36/22 370/235 |
| 2014/0376515 A1* | 12/2014 | Lei | | H04W 36/08 370/331 |
| 2015/0208286 A1* | 7/2015 | Ozturk | | H04W 36/14 370/331 |
| 2015/0351019 A1* | 12/2015 | Leonov | | H04W 4/02 370/338 |
| 2016/0021606 A1* | 1/2016 | Gupta | | H04L 5/0057 370/328 |
| 2016/0043844 A1* | 2/2016 | Meylan | | H04W 72/04 370/329 |
| 2016/0080958 A1* | 3/2016 | Rinne | | H04W 24/10 370/338 |
| 2016/0088542 A1* | 3/2016 | Belghoul | | H04W 28/0231 370/331 |
| 2016/0135120 A1* | 5/2016 | Sirotkin | | H04W 48/14 370/329 |
| 2016/0212755 A1* | 7/2016 | Cao | | H04W 24/08 |
| 2016/0227416 A1* | 8/2016 | Suzuki | | H04W 72/0453 |
| 2016/0277974 A1* | 9/2016 | Persson | | H04W 36/0022 |
| 2016/0323903 A1* | 11/2016 | Fujishiro | | H04W 72/10 |
| 2017/0195944 A1* | 7/2017 | Luo | | H04W 72/04 |
| 2017/0207893 A1* | 7/2017 | Meylan | | H04L 43/16 |
| 2017/0289839 A1* | 10/2017 | Choi | | H04W 72/1278 |
| 2017/0290021 A1* | 10/2017 | Choi | | H04W 28/0278 |
| 2017/0374579 A1* | 12/2017 | Wang | | H04L 47/30 |
| 2018/0034860 A1* | 2/2018 | Russell | | H04L 65/1016 |
| 2018/0132154 A1* | 5/2018 | Sirotkin | | H04W 48/14 |
| 2018/0227968 A1* | 8/2018 | Wang | | H04W 12/0431 |
| 2019/0239261 A1* | 8/2019 | Wang | | H04W 48/08 |
| 2019/0380164 A1* | 12/2019 | Belghoul | | H04W 28/08 |

FOREIGN PATENT DOCUMENTS

| | | |
|---|---|---|
| CN | 103220786 A | 7/2013 |
| EP | 2757829 A1 | 7/2014 |
| EP | 3257183 B1 | 6/2021 |
| WO | 2013/138711 A1 | 9/2013 |
| WO | 2014/110777 A1 | 7/2014 |
| WO | 2014/110803 A1 | 7/2014 |
| WO | 2014/116569 A1 | 7/2014 |
| WO | 2014/133589 A1 | 9/2014 |

OTHER PUBLICATIONS

"New WI Proposal: LTE-WLAN Radio Level Integration and Interworking Enhancement", 3GPP TSG-RAN meeting ¥67, RP-150510, Agenda: 13.1.2, Intel Corporation, Mar. 9-12, 2015, 9 pages.
"3rd Generation Partnership Project; Technical Specification Group Radio Access Network; Study on Wireless Local Area Network (WLAN)—3GPP radio interworking (Release 12)", 3GPP TR 37.834, V12.0.0, Dec. 2013, pp. 1-17.
Naik, "LTE WLAN Interworking for WI-FI Hotspots", Second International Conference on Communication Systems and Networks, 2010, 2 pages.
Patterson et al., "An Economic Model of Subscriber Offloading Between Mobile Network Operators and a Wlan Operator", Thesis, 2014, 102 pages.
"New Work Item Proposal: WLAN/3GPP Radio Interworking", 3GPP TSG|WG-RAN Meeting #62, RP-132101, Agenda: 13.1.2, Intel Corporation, Dec. 3-6, 2013, 7 pages.
"3rd Generation Partnership Project; Technical Specification Group Radio Access Network; Evolved Universal Terrestrial Radio Access (E-UTRA); LTE physical layer; General description(Release 12)", 3GPP TS 36.201, V12.1.0, Dec. 2014, pp. 1-13.
"3rd Generation Partnership Project; Technical Specification Group Radio Access Network; Evolved Universal Terrestrial Radio Access (E-UTRA); Physical channels and modulation(Release 12)", 3GPP TS 36.211, V12.4.0, Dec. 2014, pp. 1-124.
"3rd Generation Partnership Project; Technical Specification Group Radio Access Network; Evolved Universal Terrestrial Radio Access (E-UTRA); Multiplexing and channel coding(Release 12)", 3GPP TS 36.212, V12.3.0, Dec. 2014, pp. 1-89.
"3rd Generation Partnership Project; Technical Specification Group Radio Access Network; Evolved Universal Terrestrial Radio Access (E-UTRA); Physical layer procedures(Release 12)", 3GPP TS 36.213, V12.4.0, Dec. 2014, pp. 1-225.
"3rd Generation Partnership Project; Technical Specification Group Radio Access Network; Evolved Universal Terrestrial Radio Access (E-UTRA); Physical layer; Measurements (Release 12)", 3GPP TS 36.214, V12.1.0, Dec. 2014, pp. 1-8.
"3rd Generation Partnership Project; Technical Specification Group Radio Access Network; Evolved Universal Terrestrial Radio Access (E-UTRA); Radio Resource Control (RRC);Protocol specification (Release 12)", 3GPP TS 36.331, V12.4.1, Dec. 2014, pp. 1-410.
"New WI Proposal: LTE-WLAN Radio Level Integration and Interworking Enhancement", 3GPP TSG RAN Meeting #67, RP-150481, Agenda: 13.1.2, Intel Corporation, Mar. 9-12, 2015, 23 pages.
International Search Report and Written Opinion received for corresponding Patent Cooperation Treaty Application No. PCT/US2015/015654, dated Oct. 6, 2015, 11 pages.
Office Action received in corresponding Chinese Application No. 201580075944.8, dated Sep. 17, 2019, 7 pages.

* cited by examiner

RECEIVE AN INDICATION OF WHETHER THE WLAN AP SUPPORTS CELLULAR WLAN AGGREGATION 210

OPERATE IN A CELLULAR WLAN AGGREGATION MODE AND SELECT, BASED ON THE RECEIVED INDICATION, A WLAN AP FOR AGGREGATION 220

CELLULAR AND WLAN AGGREGATION

FIELD

The subject matter described herein relates to wireless

BACKGROUND

The use of heterogeneous networks (HetNets) may provide opportunities for offloading traffic from macro cells to a typically higher capacity small cells. The heterogeneous network may include one or more wireless access points, such as WiFi wireless access points, serving one or more small cells, and may also include one or more base stations serving macro cells. For example, a WiFi wireless access point may be implemented to cover a small cell, or coverage area, examples of which include a residence, a small business, a building, an office, or a small area. The WiFi wireless access point may have less range and output power given its limited coverage area but provide greater capacity and data rates. Accordingly, wireless service providers view small cells as a way to extend service coverage, as a way to offload traffic to the small cells, and/or as a way to provide enhanced service, such as for example higher data rates, lower latencies, energy efficiency and the like.

SUMMARY

In some example embodiments there is provided a method. The method may determining, by a user equipment, whether at least one wireless local area network access point allows aggregation with cellular; and selecting, by the user equipment based on the determination, to couple to the at least one wireless local area network access point to enable the aggregation with cellular.

In some variations, one or more of the features disclosed herein including the following features can optionally be included in any feasible combination. The determining may further include determining whether the at least one wireless local area network access point allows aggregation with cellular based on at least an indication representative of whether the at least one wireless local area network access point supports aggregation with cellular. The indication may be received from a base station. The indication may be received from the wireless local area network access point. The indication may include a list of at least one wireless local area network identities. The list may further include a support indication for each of the at least one wireless local area network identities, and wherein the support indication may represent support for aggregation with cellular. The support indication may represent lack of support for aggregation with cellular. The indication may be received from an access network discovery and selection function server. The indication may include an access network discovery and selection function policy. The indication may be in accordance with at least one of open mobile alliance-device management signaling, hot spot signaling, a hot spot policy, a system information block, or a system information block 17. The user equipment, while in a mode enabling the aggregation with cellular, may divide packet transmission between a cellular transceiver and a wireless local area network transceiver. The user equipment, while in the mode enabling the aggregation with cellular, may combine packet received from the cellular transceiver and the wireless local area network transceiver. The user equipment may determine whether to send a measurement report to a cellular base station. The sending may be performed after the user equipment associates with the at least one wireless local area network access point. The user equipment may determine whether to activate the aggregation with cellular.

The above-noted aspects and features may be implemented in systems, apparatuses, methods, and/or computer-readable media depending on the desired configuration. The details of one or more variations of the subject matter described herein are set forth in the accompanying drawings and the description below. Features and advantages of the subject matter described herein will be apparent from the description and drawings, and from the claims. In some exemplary embodiments, one of more variations may be made as well as described in the detailed description below and/or as described in the following features.

DESCRIPTION OF DRAWINGS

In the drawings.

Like labels are used to refer to the same or similar items in the drawings.

DETAILED DESCRIPTION

In Hetnets, there may be provided an interworking. In interworking, the network may specify at the access point network level whether for example a data transmission should be steered to a cellular network or to a wireless local area network. This steering is somewhat static in the sense that a flow of packets from an application for example will be transmitted (as a whole and at the access point network level) via the cellular network or the wireless local area network but not both simultaneously. By contrast, cellular wireless local area network aggregation is more dynamic in the sense that a packet flow may be divided, so that packets from the flow can be divided (for example, via scheduling and the like) to the cellular network, the wireless local area network, or both. For example, a UE may divide a first portion of packets for transmission via cellular and a second portion of packets for transmission via the wireless local area network. In this example, the packets can later be combined in the network. In this way, cellular to wireless local area network aggregation enables more dynamic control (by for example the network) of both cellular and wireless local area network resources.

In some instances, cellular WLAN aggregation may enable unified control and management of both cellular and WLAN networks. In cellular WLAN aggregation, radio resource management may provide scheduling of cellular and WLAN resources. Furthermore, the generally more reliable cellular may be used as a control and mobility anchor to provide quality of experience improvements, reduce service interruption, and increase network operator control. Additional details regarding cellular WLAN aggregation can be found at 3GPP TSG RAN Meeting #67, RP-15xxxx, Shanghai, PRC, March 2015, LTE-WLAN Radio Level Integration and Interworking Enhancement as well as 3GPP TSG, WG-RAN Meeting #62, RP-132101, Korea, Busan, Dec. 3-Dec. 6, 2013, WLAN/3GPP Radio Interworking-Core.

User equipment (UE), such as a cell phone, smart phone, and/or the like, may be configured to operate in an aggregation mode in which both cellular radio access and wireless local area network (WLAN) radio access are used. When in the cellular WLAN aggregation mode, the UE may have an active cellular radio bearer over which packets may be transmitted or received, and the UE may have an active wireless local area network bearer over which packets may be transmitted or received. In the uplink transmission case for example, the UE may divide the transmission of packets (for example a flow of packets from a higher level application at the UE) between a cellular transceiver (providing a cellular uplink to a base station) and a WLAN transceiver (providing a WLAN uplink to WLAN wireless access point). However, before a UE is able to aggregate WLAN carriers with cellular carriers, the UE may need to know whether a given WLAN wireless access point allows aggregation with cellular. To that end, in some example embodiments, the network may signal the UE with configuration information indicative of whether a WLAN wireless access point (AP) supports aggregation.

Although the previous example refers to cellular WLAN aggregation on an uplink, cellular WLAN aggregation may be used on the downlink as well, in which case the network may determine which data is sent via the WLAN downlink and which data is sent via a cellular downlink.

In some example embodiments, the UE may receive information about operator controlled WLANs, which may be used by the UE for cellular WLAN aggregation as well as a cellular WLAN interworking.

Cellular and/or WLAN interworking signaling may, in accordance with some example embodiments, be extended to include information regarding a WLAN access point's support for cellular WLAN aggregation, although this support information may be signaled in other ways as well.

Figure 1:
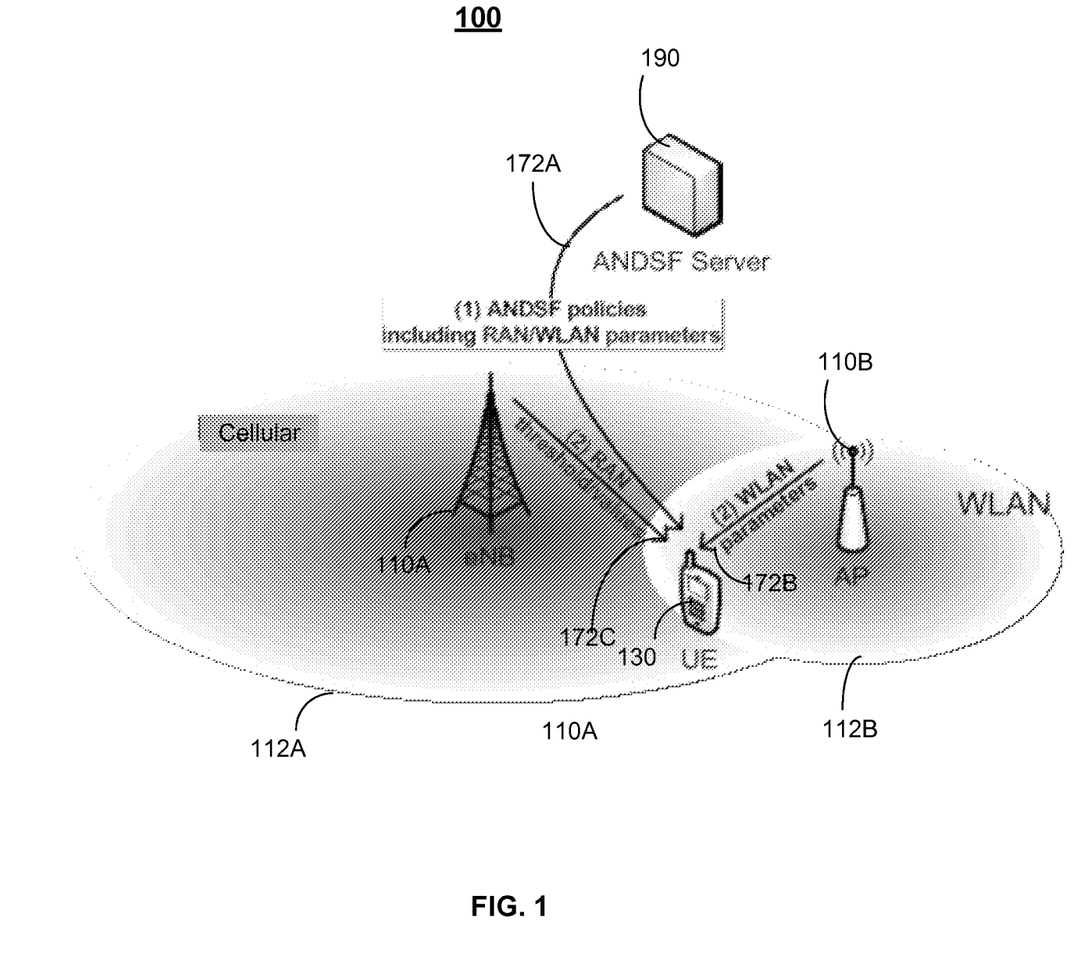
FIG. 1 depicts an example of a system for cellular and wireless local area network aggregation, in accordance with some example embodiments.

FIG. 1 depicts an example system 100 including a WLAN access point 110B, such as a WiFi access point and/or the like, serving a coverage area 112B, and system 100 may also include a cellular base station 110A, such as for example an evolved Node B base station, serving a macro cell 112A, in accordance with some example embodiments.

System 100 may also include a user equipment 130, as well as other nodes including for example an access network discovery and selection function (ANDSF) server 190. In the example of FIG. 1, the ANDSF server 190 may signal 172A (or provide policies to) the UE 130, and this signaling may indicate to the UE whether the WLAN access point 110B supports cellular WLAN aggregation. For example, the ANDSF policies may list one or more WLAN identifiers indicating which WLAN APs support cellular WLAN aggregation and/or which do not support WLAN aggregation. Alternatively or additionally, the cellular WLAN aggregation support information may be provided in other ways as well including provided via a broadcast by a network node, such as a base station 110A or WLAN access point 110B (or other device), provided via dedicated signaling to the UE (from the base station 110A and/or WLAN access point 110B), provided via open mobile alliance-device management (OMA-DM) signaling, and/or provided via access network discovery and selection functionality (ANDSF).

Although FIG. 1 depicts a specific quantity and configuration of base stations, cells, user equipment, and the like, other quantities and configurations may be implemented as well. Moreover, the base station and wireless access point may include backhaul links to other networks (for example, the internet), nodes (other base stations, wireless access points, gateways, and so forth), and/or the like. Furthermore, although some of the examples described herein refer to WiFi, other short-range radio technologies may be used as well.

In some example embodiments, the network may, as noted, indicate to the UE 130 (either via dedicated or broadcast signaling) a list of WLAN identifiers (for example, a service set identifier (SSID), a basic service set identification (BSSID), a homogeneous extended service set identifier (HESSID), and/or any other type of identifier), which may allow (for example, be capable of, supports, or can be used for) cellular WLAN aggregation. This information may also indicate support for cellular WLAN interworking.

In some example embodiments, UE 130 may receive the indication as noted in either dedicated signaling or broadcast signaling, and the indication may inform the UE 130 regarding whether some (if not all of) the operator controlled WLANs can also be used for cellular WLAN aggregation. Alternatively or additionally, the indication may specify which WLAN access points support cellular WLAN aggregation and which WLAN access points do not support cellular WLAN aggregation. This indication may be provided, in some example embodiments, via a system information block (SIB), such as SIB 17 extended to include the WLAN identifier(s) of the WLAN access points supporting cellular WLAN aggregation, although the indication regarding cellular WLAN aggregation support by a given WLAN access point may be provided in other ways as well.

In some example embodiments, the SIB 17 may be extended to include information indicative of cellular WLAN aggregation support. For example, the SIB 17 may include a list of WLAN identifiers and an indication of whether (or not) the identified WLAN supports cellular WLAN aggregation (which can be signaled by 1-bit for each identifier). Table 1 depicts an example extension to SIB 17.

TABLE

SystemInformation BlockType17 information element

```
ASN1START
SystemInformationBlockType17-r12 ::=    SEQUENCE {
    wlan-offloadPerPLMN-List-r12            SEQUENCE (SIZE (1..maxPLMN-r11) OF
                                            WLAN-OffloadPerPLMN-r12    OPTIONAL,
-- Need OR
    lateNonCriticalExtension                OCTET STRING               OPTIONAL,
    ...
}
WLAN-OffloadPerPLMN-r12 ::=     SEQUENCE {
    wlan-offloadConfigCommon-r12        WLAN-offloadConfig-r12    OPTIONAL,  --
Need OR
```

TABLE-continued

SystemInformation BlockType17 information element

```
    wlan-Id-List-r12              WLAN-Id-List-r12           OPTIONAL  --
Need OR
  }
WLAN-Id-List-r12 ::=  SEQUENCE (SIZE (1..maxWLAN-Id-r12)) OF WLAN-Id-r12
WLAN-Id-r12 ::=    SEQUENCE {
    wlan-Identifiers              CHOICE {
      ssid                          OCTET STRING (SIZE (1..32)),
      bssid                         OCTET STRING (SIZE (6)),
      hessid                        OCTET STRING (SIZE (6))
  }
WLAN-aggregation-Id-List-r13 ::=   SEQUENCE (SIZE (1..maxWLAN-Id-r13)) OF
  WLAN-Id-r12
-
-    WLAN-Id-r13 ::=              SEQUENCE {
-    wlan-Identifiers              CHOICE {
-      ssid                          OCTET STRING (SIZE (1..32)),
-      bssid                         OCTET STRING (SIZE (6)),
-      hessid                        OCTET STRING (SIZE (6)),
-    }
-  }
}
- ASNISTOP
```

In some example embodiments, the indication to the UE (also referred to herein as a STA) regarding whether cellular WLAN aggregation is supported at a given WLAN access point may take the form of at least one bit that indicates whether all of the signaled WLAN APs support cellular WLAN aggregation (for example, true, all of the signaled WLAN AP support aggregation, or false, not all of the signaled WLANs support aggregation. Moreover, the indication regarding cellular WLAN aggregation may include a list of WLAN APs identifiers, each of which indicates whether there is support for aggregation (for example, a WLAN AP identifier, such as SSID, BSSID, or HESSID, followed by at least one bit indicating cellular WLAN aggregation at the WLAN AP.)

In some example embodiments, WLAN AP 110B may explicitly indicate at 172B to UE 130 (which may also be referred to as a station, STA) whether WLAN AP 110B supports (for example, is capable of, allows, willing to accept, configured to, and the like) cellular WLAN aggregation. In some example embodiments, the WLAN AP may indicate to UE 130 one or more identities of WLAN APs (for example, basic service set identification information, and/or the like) supporting cellular WLAN aggregation.

In some example embodiments, UE 130 may receive an indication regarding whether a WLAN AP supports cellular WLAN aggregation, and this indication may be in accordance with open mobile alliance-device management signaling. For example, open mobile alliance-device management signaling may list one or more identities of WLAN APs (for example, basic service set identification information, and/or the like) supporting cellular WLAN aggregation.

In some example embodiments, UE 130 may receive an indication regarding whether a WLAN AP supports cellular WLAN aggregation, Hot Spot 2.0 policy information may list one or more identities of WLAN APs supporting cellular WLAN aggregation. For example, the UE (or STA) may receive hotspot policy from a node, such as hotspot server (although the policy may be pre-provisioned in the UE as well during for example manufacture or other times as well). The implementation of these policy (or policies) may also rely on the functionality of the UE. The functionality may be native to the UE (for example in firmware) or a client application (which may be downloaded or provisioned in other ways). As such, the UE may receive an indication regarding aggregation from the network, such as a beacon or explicit signaling from a WLAN server or access point, although the UE may have policy, such as Hot Spot 2.0 policy, provisioned (as noted) that indicates which WLANs can be used for aggregation as well.

In some example embodiments, the network (or node therein and/or any other node) may configure a WLAN AP, such as WLAN AP 110B, for cellular WLAN aggregation. For example, the configuration may indicate to the WLAN AP 110B that it is allowed to take part in cellular WLAN aggregation. To illustrate further, the UE may be in a cellular access and receive from the cellular network for example, a list of at least one WLAN identifier, such as SSID, BSSID, HESSID, and/or the like, indicating support for cellular WLAN aggregation. The UE may then monitor and/or measure of the listed WLAN AP to determine whether a connection can (or should be) made based on for example signal quality. The UE may then report to the network WLAN APs, which support aggregation and have sufficient link quality of a connection. The cellular base station and/or WLAN AP may then prepare for aggregation for the UE by for example establishing an interface between cellular base station and/or WLAN AP. The cellular base station may signal an aggregation configuration to the UE (for example, send an indication to aggregate with or a schedule), so the UE can aggregate with a WLAN AP. Moreover, the network may control the aggregation by scheduling the UE's use of the uplinks and/or downlinks for the cellular and/or WLAN aggregation.

Figure 2:
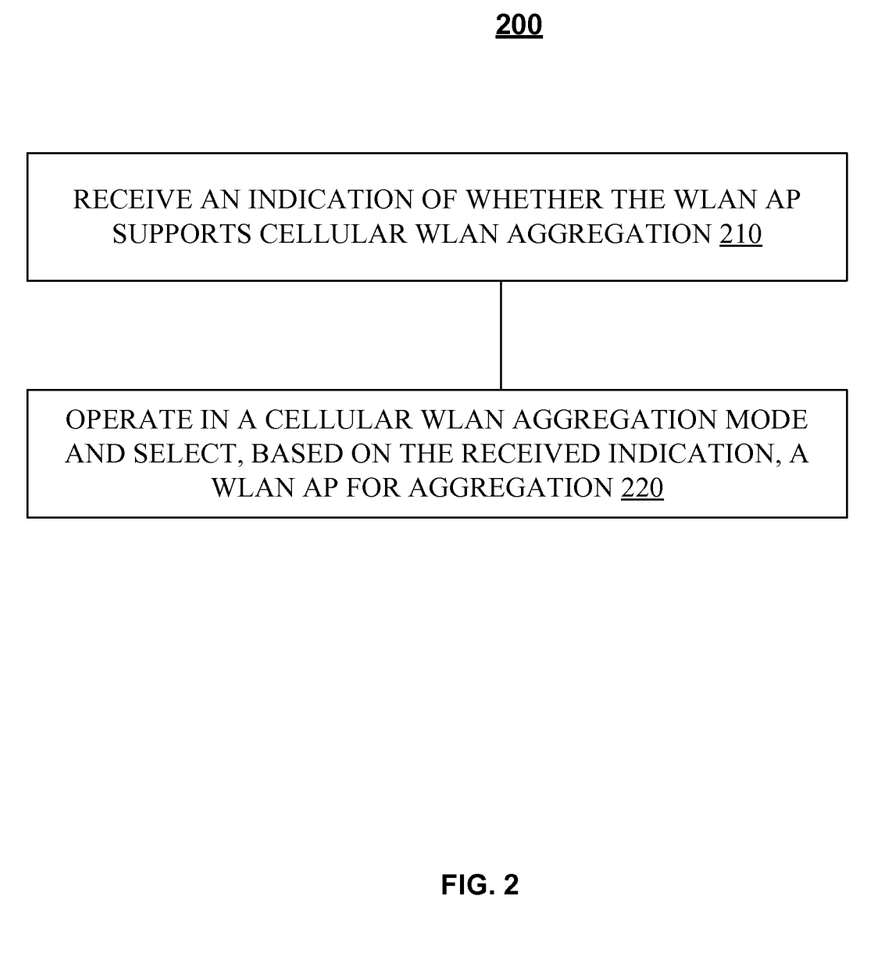
FIG. 2 depicts an example of a process for cellular and wireless local area network aggregation, in accordance with some example embodiments.

FIG. 2 depicts a process 200 for informing a UE regarding WLAN AP support for cellular WLAN aggregation, in accordance with some example embodiments.

At 210, the UE may receive an indication of whether the WLAN AP 110B supports cellular WLAN aggregation, in accordance with some example embodiments. For example, the UE may receive an indication from base station 110A, and this indication may list one or more WLAN APs supporting cellular WLAN aggregation. The list may include WLAN identities for one WLAN APs and an indication of whether (or not) the WLAN AP supports cellular WLAN aggregation. The indication may, as noted, be in the form of ANDSF policy, OMA-DM, Hot Sot 2.0 signaling, a SIB, such as SIB 17, extended to indicate aggregation support, WLAN signaling, cellular signaling, a broadcast, dedicated signaling, and/or the like.

At 220, the UE may then operate in a cellular WLAN aggregation mode and select, based on the received indication, a WLAN AP for aggregation, in accordance with some example embodiments. For example, UE 130 may have packets ready for transmission (for example, from a higher level application). When this is the case, the UE may operate in a cellular WLAN aggregation mode and thus divide the packets so that a portion are transmitted via the UE's cellular transceiver to an uplink to base station 110A and another portion are transmitted via the UE's WLAN transceiver to an uplink to a selected WLAN AP 110B. In some example embodiments, the selection may also include measurements of the WLAN AP to determine whether a link can be established of sufficient quality.

In some example embodiments, the may UE be allowed to send measurement report(s) (via cellular links to the base station) related to WLAN aggregation (for example, WLAN APs supporting aggregation), but the UE may be inhibited or prevented from sending to measurement reports (via cellular links to the base station) for those WLAN APs that do not support aggregation. In some example embodiments, the UE may be configured to enable (for example, allow) measurement reporting (via cellular links to the base station) when the UE has associated itself with the WLAN supporting aggregation, but the UE may be inhibited or prevented from sending measurement reports (via cellular links to the base station) when the UE has not associated itself with the WLAN supporting aggregation. Although the previous restrictions are based on whether the WLAN AP supports aggregation, the reporting may be condition on just whether the UE is associated with the WLAN AP as well.

In some example embodiments, the may UE may be configured mandated to perform an association procedure with a WLAN AP before sending measurement report or before aggregation is configured. The UE may signal to the network whether WLAN association procedure is performed.

Figure 3:
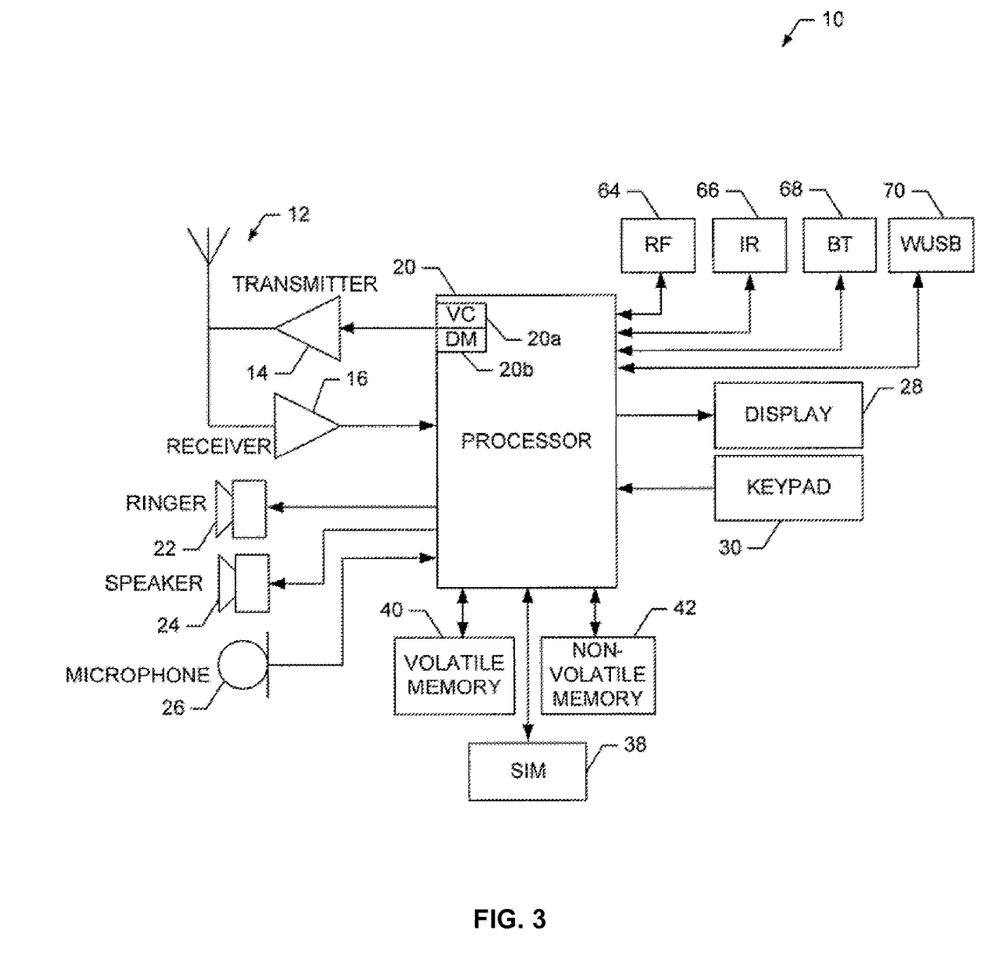
FIG. 3 depicts an example of an apparatus, in accordance with some example embodiments.

FIG. 3 depicts an example of an apparatus 10, in accordance with some example embodiments. The apparatus 10 may comprise user equipment 130, such as a smart phone, a tablet, a cell phone, a wearable radio device, a tag, an Internet of Things device, and/or any other radio based device.

In some example embodiments, apparatus 10 may also include a radio communication link to a cellular network, or other wireless network. The apparatus 10 may include an antenna array 12 in communication with a transmitter 14 and a receiver 16. Alternatively transmit and receive antennas may be separate.

The apparatus 10 may also include a processor 20 configured to provide signals to and from the transmitter and receiver, respectively, and to control the functioning of the apparatus. Processor 20 may be configured to control the functioning of the transmitter and receiver by effecting control signaling via electrical leads to the transmitter and receiver. Likewise, processor 20 may be configured to control other elements of apparatus 10 by effecting control signaling via electrical leads connecting processor 20 to the other elements, such as a display or a memory. The processor 20 may, for example, be embodied in a variety of ways including circuitry, at least one processing core, one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits (for example, an application specific integrated circuit (ASIC), a field programmable gate array (FPGA), and/or the like), or some combination thereof. Apparatus 10 may include a location processor and/or an interface to obtain location information, such as positioning and/or navigation information. Accordingly, although illustrated in as a single processor, in some example embodiments the processor 20 may comprise a plurality of processors or processing cores.

Signals sent and received by the processor 20 may include signaling information in accordance with an air interface standard of an applicable cellular system, and/or any number of different wireline or wireless networking techniques, comprising but not limited to Wi-Fi, wireless local access network (WLAN) techniques, such as, Institute of Electrical and Electronics Engineers (IEEE) 802.11, 802.16, and/or the like. In addition, these signals may include speech data, user generated data, user requested data, and/or the like.

The apparatus 10 may be capable of operating with one or more air interface standards, communication protocols, modulation types, access types, and/or the like. For example, the apparatus 10 and/or a cellular modem therein may be capable of operating in accordance with various first generation (1G) communication protocols, second generation (2G or 2.5G) communication protocols, third-generation (3G) communication protocols, fourth-generation (4G) communication protocols, Internet Protocol Multimedia Subsystem (IMS) communication protocols (for example, session initiation protocol (SIP) and/or the like. For example, the apparatus 10 may be capable of operating in accordance with 2G wireless communication protocols IS-136, Time Division Multiple Access TDMA, Global System for Mobile communications, GSM, IS-95, Code Division Multiple Access, CDMA, and/or the like. In addition, for example, the apparatus 10 may be capable of operating in accordance with 2.5G wireless communication protocols General Packet Radio Service (GPRS), Enhanced Data GSM Environment (EDGE), and/or the like. Further, for example, the apparatus 10 may be capable of operating in accordance with 3G wireless communication protocols, such as, Universal Mobile Telecommunications System (UMTS), Code Division Multiple Access 2000 (CDMA2000), Wideband Code Division Multiple Access (WCDMA), Time Division-Synchronous Code Division Multiple Access (TD-SCDMA), and/or the like. The apparatus 130 may be additionally capable of operating in accordance with 3.9G wireless communication protocols, such as, Long Term Evolution (LTE), Evolved Universal Terrestrial Radio Access Network (E-UTRAN), and/or the like. Additionally, for example, the apparatus 10 may be capable of operating in accordance with 4G wireless communication protocols, such as LTE Advanced and/or the like as well as similar wireless communication protocols that may be subsequently developed.

It is understood that the processor 20 may include circuitry for implementing audio/video and logic functions of apparatus 10. For example, the processor 20 may comprise a digital signal processor device, a microprocessor device, an analog-to-digital converter, a digital-to-analog converter, and/or the like. Control and signal processing functions of the apparatus 10 may be allocated between these devices according to their respective capabilities. The processor 20 may additionally comprise an internal voice coder (VC) 20a, an internal data modem (DM) 20b, and/or the like. Further, the processor 20 may include functionality to operate one or more software programs, which may be stored in memory. In general, processor 20 and stored software instructions may be configured to cause apparatus 10 to perform actions. For example, processor 20 may be capable of operating a connectivity program, such as, a web browser. The connectivity program may allow the apparatus 10 to transmit and receive web content, such as location-based content, according to a protocol, such as, wireless application protocol, wireless access point, hypertext transfer protocol, HTTP, and/or the like.

Apparatus 10 may also comprise a user interface including, for example, an earphone or speaker 24, a ringer 22, a microphone 26, a display 28, a user input interface, and/or the like, which may be operationally coupled to the processor 20. The display 28 may, as noted above, include a touch sensitive display, where a user may touch and/or gesture to make selections, enter values, and/or the like. The processor 20 may also include user interface circuitry configured to control at least some functions of one or more elements of the user interface, such as, the speaker 24, the ringer 22, the microphone 26, the display 28, and/or the like. The processor 20 and/or user interface circuitry comprising the processor 20 may be configured to control one or more functions of one or more elements of the user interface through computer program instructions, for example, software and/or firmware, stored on a memory accessible to the processor 20, for example, volatile memory 40, non-volatile memory 42, and/or the like. The apparatus 10 may include a battery for powering various circuits related to the mobile terminal, for example, a circuit to provide mechanical vibration as a detectable output. The user input interface may comprise devices allowing the apparatus 10 to receive data, such as, a keypad 30 (which can be a virtual keyboard presented on display 28 or an externally coupled keyboard) and/or other input devices.

Moreover, the apparatus 10 may include a short-range radio frequency (RF) transceiver and/or interrogator 64, so data may be shared with and/or obtained from electronic devices in accordance with RF techniques. The apparatus 10 may include other short-range transceivers, such as an infrared (IR) transceiver 66, a Bluetooth (BT) transceiver 68 operating using Bluetooth wireless technology, a wireless universal serial bus (USB) transceiver 70, and/or the like. The Bluetooth transceiver 68 may be capable of operating according to low power or ultra-low power Bluetooth technology, for example, Wibree, Bluetooth Low-Energy, NFC, and other radio standards. In this regard, the apparatus 10 and, in particular, the short-range transceiver may be capable of transmitting data to and/or receiving data from electronic devices within proximity of the apparatus, such as within 10 meters. The apparatus 10 including the Wi-Fi or wireless local area networking modem may also be capable of transmitting and/or receiving data from electronic devices according to various wireless networking techniques, including 6LoWpan, Wi-Fi, Wi-Fi low power, WLAN techniques such as IEEE 802.11 techniques, IEEE 802.15 techniques, IEEE 802.16 techniques, and/or the like.

The apparatus 10 may comprise memory, such as, a subscriber identity module (SIM) 38, a removable user identity module (R-UIM), and/or the like, which may store information elements related to a mobile subscriber. In addition to the SIM, the apparatus 10 may include other removable and/or fixed memory. The apparatus 10 may include volatile memory 40 and/or non-volatile memory 42. For example, volatile memory 40 may include Random Access Memory (RAM) including dynamic and/or static RAM, on-chip or off-chip cache memory, and/or the like. Non-volatile memory 42, which may be embedded and/or removable, may include, for example, read-only memory, flash memory, magnetic storage devices, for example, hard disks, floppy disk drives, magnetic tape, optical disc drives and/or media, non-volatile random access memory (NVRAM), and/or the like. Like volatile memory 40, non-volatile memory 42 may include a cache area for temporary storage of data. At least part of the volatile and/or non-volatile memory may be embedded in processor 20. The memories may store one or more software programs, instructions, pieces of information, data, and/or the like which may be used by the apparatus for performing operations as described herein at for example process 200. The memories may comprise an identifier, such as an international mobile equipment identification (IMEI) code, capable of uniquely identifying apparatus 10. The functions may include one or more of the operations disclosed herein with respect to process 200. In the example embodiment, the processor 20 may be configured using computer code stored at memory 40 and/or 42 to provide the operations, such as receiving, at a user equipment, an indication representative of whether a wireless local area network access points supports aggregation with cellular; selecting, by the user equipment, the wireless local area network access point for coupling, when the received indication represents support for aggregation with cellular; and operating, at the user equipment, in a cellular WLAN aggregation mode by at least transmitting at least one packet to the selected wireless local area network access point.

Some of the embodiments disclosed herein may be implemented in software, hardware, application logic, or a combination of software, hardware, and application logic. The software, application logic, and/or hardware may reside in memory 40, the control apparatus 20, or electronic components disclosed herein, for example. In some example embodiments, the application logic, software or an instruction set is maintained on any one of various conventional computer-readable media. In the context of this document, a "computer-readable medium" may be any non-transitory media that can contain, store, communicate, propagate or transport the instructions for use by or in connection with an instruction execution system, apparatus, or device, such as a computer or data processor circuitry. A computer-readable medium may comprise a non-transitory computer-readable storage medium that may be any media that can contain or store the instructions for use by or in connection with an instruction execution system, apparatus, or device, such as a computer. Furthermore, some of the embodiments disclosed herein include computer programs configured to cause methods as disclosed herein with respect to the network including process 200 and/or the like.

Figure 4:
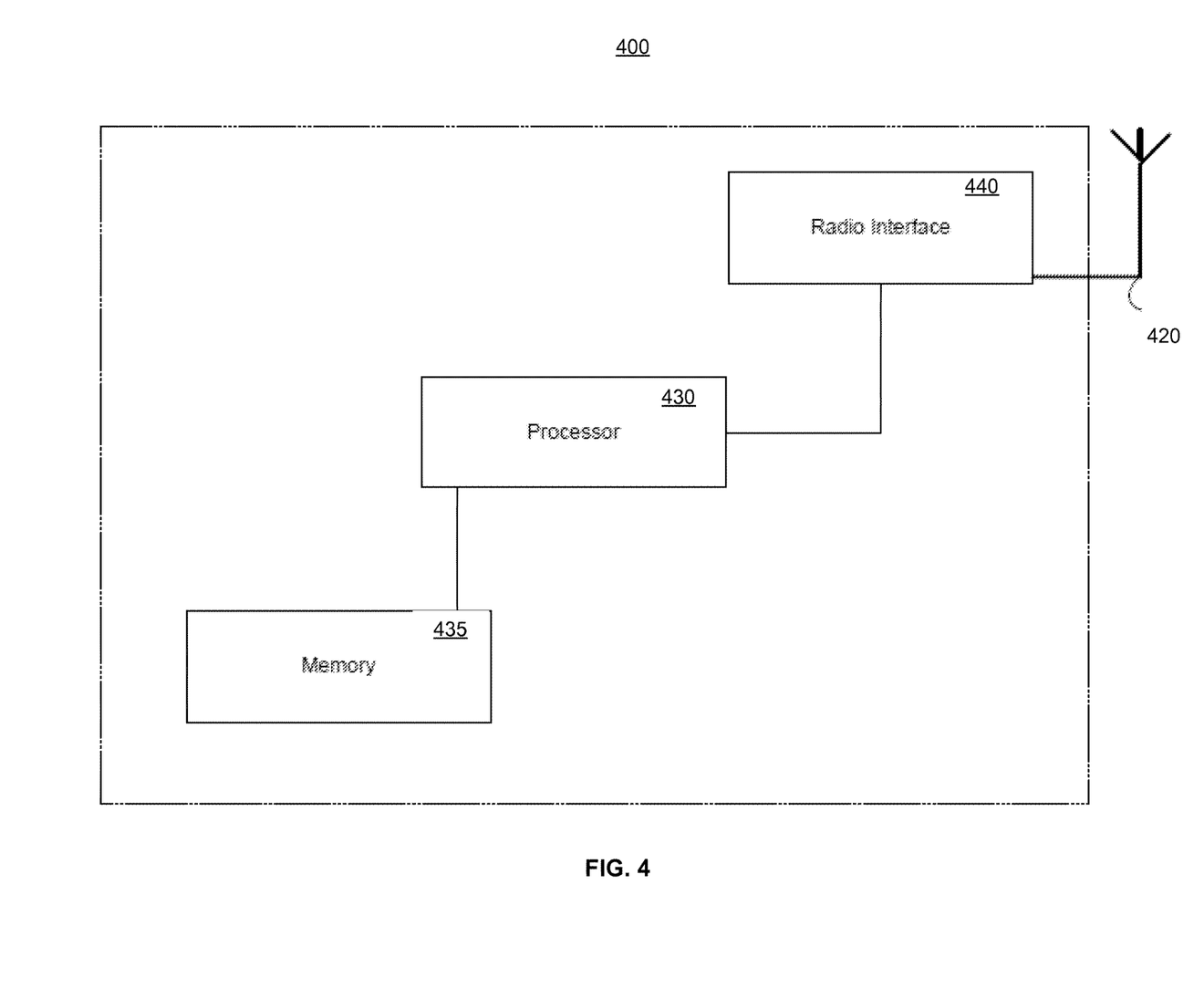
FIG. 4 depicts another example of an apparatus, in accordance with some example embodiments.

FIG. 4 depicts an example implementation of a network node 400, such as a wireless access point 110B or a base station 110A, in accordance with some example embodiments. The node 400 may include one or more antennas 420 configured to transmit via downlinks and configured to receive uplinks via the antenna(s) 420. The node 400 may further include a plurality of radio interfaces 440 coupled to the antenna(s) 420. The radio interfaces 440 may correspond to a plurality of radio access technologies including one or more of cellular, LTE, WLAN, Bluetooth, BT-LE, NFC, radio frequency identifier (RFID), ultrawideband (UWB), ZigBee, and the like. The radio interface 440 may include circuitry, such as filters, converters (for example, digital-to-analog converters and the like), mappers, a Fast Fourier Transform (FFT) module, and the like. The node 400 may further include one or more processors, such as processor circuitry 430, for controlling the node 400 and for accessing and executing program code stored in memory 435. In some example embodiments, the memory 435 includes program code, which when executed by at least one processor, causes one or more of the operations described herein with respect to the base station 110A and/or wireless access point 110B. For example, the operations may include sending the indication regarding whether a WLAN AP supports aggregation, and/or perform any other operations associated with the base station 110A and/or wireless access point 110B disclosed herein.

The base station 110A may, in some example embodiments, be implemented as an evolved Node B (eNB) type base station, although other types of radio, access points may be implemented as well such as WLAN or Wi-Fi type of access point. When the evolved Node B (eNB) type base station is used, the base may be configured in accordance with standards, including the Long Term Evolution (LTE) standards, such as for example 3GPP TS 36.201, Evolved Universal Terrestrial Radio Access (E-UTRA), Long Term Evolution (LTE) physical layer, General description, 3GPP TS 36.211, Evolved Universal Terrestrial Radio Access (E-UTRA), Physical channels and modulation, 3GPP TS 36.212, Evolved Universal Terrestrial Radio Access (E-UTRA), Multiplexing and channel coding, 3GPP TS 36.213, Evolved Universal Terrestrial Radio Access (E-UTRA), Physical layer procedures, 3GPP TS 36.214, Evolved Universal Terrestrial Radio Access (E-UTRA), Physical layer—Measurements Protocol specification, 3GPP TS 36.331, Technical Specification Group Radio Access Network, Evolved Universal Terrestrial Radio Access (E-UTRA), Radio Resource Control (RRC), and any subsequent additions or revisions to these and other 3GPP series of standards (collectively referred to as LTE standards). The wireless access point 110—may also be configured to serve cells using a WLAN technology, such as for example WiFi (for example, the IEEE 802.11 series of standards), as well as any other radio access technology capable of serving a cell.

Without in any way limiting the scope, interpretation, or application of the claims appearing below, a technical effect of one or more of the example embodiments disclosed herein is enhanced cellular WLAN aggregation and/or reduced battery consumption at the UE.

The subject matter described herein may be embodied in systems, apparatus, methods, and/or articles depending on the desired configuration. For example, the systems, apparatus, methods, and/or articles described herein can be implemented using one or more of the following: electronic components such as transistors, inductors, capacitors, resistors, and the like, a processor executing program code, an application-specific integrated circuit (ASIC), a digital signal processor (DSP), an embedded processor, a field programmable gate array (FPGA), and/or combinations thereof. These various example embodiments may include implementations in one or more computer programs that are executable and/or interpretable on a programmable system including at least one programmable processor, which may be special or general purpose, coupled to receive data and instructions from, and to transmit data and instructions to, a storage system, at least one input device, and at least one output device. These computer programs (also known as programs, software, software applications, applications, components, program code, or code) include machine instructions for a programmable processor, and may be implemented in a high-level procedural and/or object-oriented programming language, and/or in assembly/machine language. As used herein, the term "machine-readable medium" refers to any computer program product, computer-readable medium, computer-readable storage medium, apparatus and/or device (for example, magnetic discs, optical disks, memory, Programmable Logic Devices (PLDs)) used to provide machine instructions and/or data to a programmable processor, including a machine-readable medium that receives machine instructions. Similarly, systems are also described herein that may include a processor and a memory coupled to the processor. The memory may include one or more programs that cause the processor to perform one or more of the operations described herein.

Although a few variations have been described in detail above, other modifications or additions are possible. In particular, further features and/or variations may be provided in addition to those set forth herein. Moreover, the example embodiments described above may be directed to various combinations and subcombinations of the disclosed features and/or combinations and subcombinations of several further features disclosed above. In addition, the logic flow depicted in the accompanying figures and/or described herein does not require the particular order shown, or sequential order, to achieve desirable results. Other embodiments may be within the scope of the following claims.

What is claimed is:

1. A method comprising:
   receiving, at a user equipment and from a cellular network, a first indication representative of whether at least one wireless local area network access point supports cellular wireless local area network aggregation;
   determining, by the user equipment and based on the first indication from the cellular network, that the at least one wireless local area network access point supports cellular wireless local area network aggregation;
   establishing, by the user equipment based on the determining, a second connection with the at least one wireless local area network access point to enable the cellular wireless local area network aggregation, wherein in the cellular wireless local area network aggregation, the second connection and a first connection, which is between the user equipment and the cellular network, are under radio resource control of the cellular network;
   sending, by the user equipment, a second indication to the cellular network, the second indication informing the cellular network of an association between the user equipment and the at least one wireless local area network access point;
   preventing measurement reporting in response to the user equipment not being associated with the at least one wireless local area network access point; and
   enabling measurement reporting in response to the user equipment being associated with the at least one wireless local area network access point.

2. The method of claim 1, further comprising:
   receiving, at the user equipment and from the wireless local area network access point, a third indication.

3. The method of claim 1, wherein the first indication comprises a list of at least one wireless local area network identities.

4. The method of claim 3, wherein the list further comprises a support indication for each of the at least one wireless local area network identities, and wherein the support indication represents support for cellular wireless local area network aggregation.

5. The method of claim 1, wherein the first indication is received from an access network discovery and selection function server.

6. The method of claim 1, wherein the first connection and the second connection are active connections over which one or more packets are carried to and/or from the user equipment.

7. An apparatus, comprising:
at least one processor; and
at least one memory including computer program code, the at least one memory and the computer program code configured to, with the at least one processor, cause the apparatus to at least:
receive, by the apparatus and from a cellular network, a first indication representative of whether at least one wireless local area network access point supports cellular wireless local area network aggregation;
determine, by the apparatus and based on the first indication being received from the cellular network, that the at least one wireless local area network access point supports cellular wireless local area network aggregation;
establish, by the apparatus and based on the determination, a second connection with the at least one wireless local area network access point to enable the cellular wireless local area network aggregation, wherein in the cellular wireless local area network aggregation, the second connection and a first connection, which is between the user equipment and the cellular network, are under radio resource control of the cellular network;
send, by the apparatus, a second indication to the cellular network, the second indication informing the cellular network of an association between the apparatus and the at least one wireless local area network access point;
preventing measurement reporting in response to the user equipment not being associated with the at least one wireless local area network access point; and
enabling measurement reporting in response to the user equipment being associated with the at least one wireless local area network access point.

8. The apparatus of claim 7, wherein the apparatus is further caused to at least:
receive, from the wireless local area network access point a third indication.

9. The apparatus of claim 7, wherein the first indication comprises a list of at least one wireless local area network identities.

10. The apparatus of claim 9, wherein the list further comprises a support indication for each of the at least one wireless local area network identities, and wherein the support indication represents support for cellular wireless local area network aggregation.

11. The apparatus of claim 7, wherein the first indication is received from an access network discovery and selection function server.

12. The apparatus of claim 11, wherein the first indication comprises an access network discovery and selection function policy.

13. The apparatus of claim 7, wherein the first indication is in accordance with open mobile alliance-device management signaling, hot spot signaling, a hot spot policy, a system information block, and/or a system information block 17.

14. The apparatus of claim 7, wherein the apparatus is further caused to at least divide, by the apparatus while in a mode enabling the cellular wireless local area network aggregation, packet transmission between the first connection via a cellular transceiver and the second connection via a wireless local area network transceiver.

15. The apparatus of claim 7, wherein the apparatus is further caused to at least combine, by the apparatus while in the mode enabling the cellular wireless local area network aggregation, packets received from the cellular transceiver and the wireless local area network transceiver.

16. The apparatus of claim 7, wherein the apparatus is further caused to at least determine, by the apparatus, whether to send a measurement report to a cellular base station.

17. The apparatus of claim 7, wherein the apparatus is further caused to at least determine, by the apparatus, whether to activate the cellular wireless local area network aggregation.

18. The apparatus of claim 7, wherein the second indication representative of whether an association procedure is performed between the apparatus and the at least one wireless local area network further comprises an indication representative of whether the apparatus has established the connection with the at least one wireless local area network.

* * * * *